A. F. BATCHELDER.
INSULATING JOINT.
APPLICATION FILED SEPT. 28, 1908.

922,556.

Patented May 25, 1909.

Witnesses:
J. Ellis Glen.
Earl G. Klock.

Inventor,
Asa F. Batchelder,
By Albert G. Davis
Att'y.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

INSULATING-JOINT.

No. 922,556.     Specification of Letters Patent.     Patented May 25, 1909.

Application filed September 28, 1908. Serial No. 455,163.

*To all whom it may concern:*

Be it known that I, ASA F. BATCHELDER, a citizen of the United States, residing at Schenectady, county of Schenectady, State of New York, have invented certain new and useful Improvements in Insulating-Joints, of which the following is a specification.

This invention relates to joints between sections of a pipe where one section must be electrically insulated from another. It is especially adapted for use in steam heating systems, where the steam is generated by passing a current of electricity through a given length of pipe containing the water to be vaporized. Provision must be made in such joint not only for a complete interruption of the electrical conductivity of the pipe at the end of the heating section, but also for permitting the expansion and contraction of the metallic portions of the joint without danger of its springing a leak.

The joint which I have invented consists of two heads secured, respectively, to the adjacent ends of the two pipe sections and connected by a sleeve or tube. The parts are thoroughly insulated by disks of mica or the like, and are secured together by insulated bolts having springs under their nuts to allow for expansion and contraction. Long creepage surfaces are provided between the metallic parts of the joint.

Figure 1:
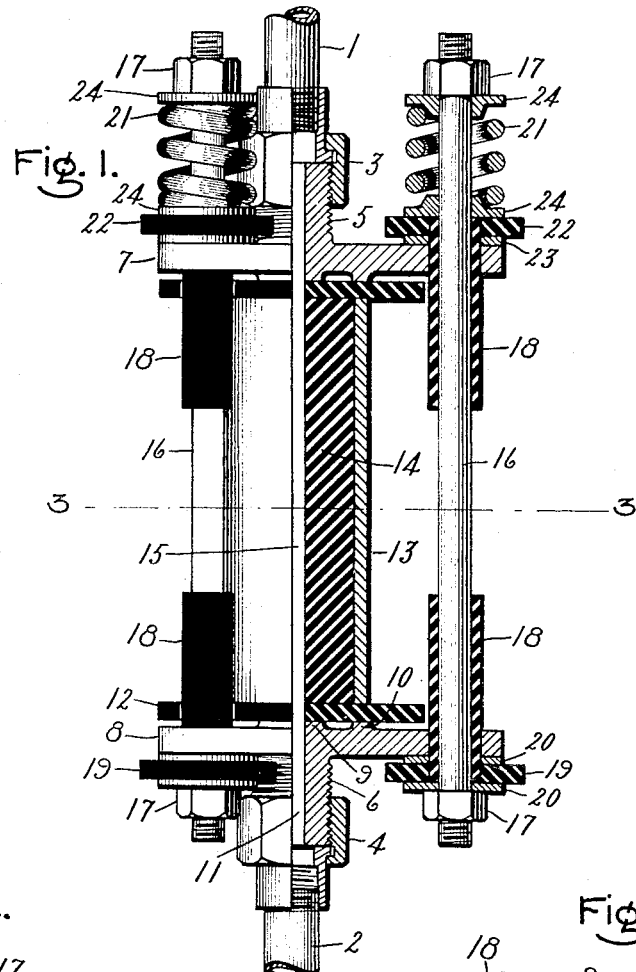
Figure 2:
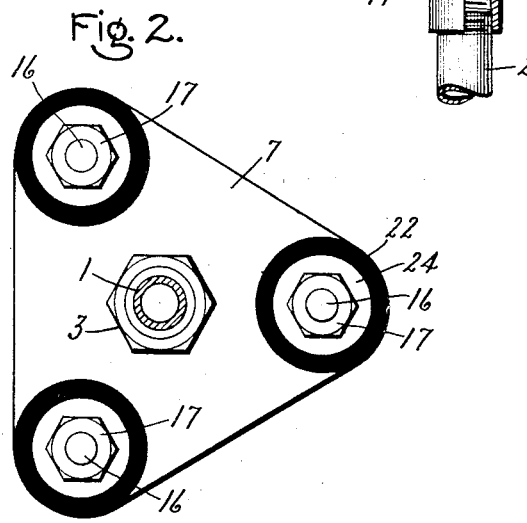
Figure 3:
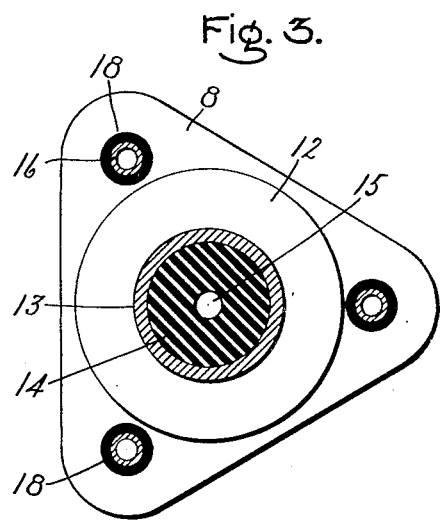

In the accompanying drawing, Figure 1 is a side elevation, half in section, of my improved joint; Fig. 2 is a top plan view, and Fig. 3 is a cross section on the line 3 3, Fig. 1.

The pipe sections 1, 2 are respectively connected by unions 3, 4 with the screw threaded nipples 5, 6 on the metallic heads 7, 8. In the drawing, these heads are shown as triangular, with rounded corners, but their shape is immaterial. On the flat faces of each head are two circular ribs 9, 10 concentric with the central bore 11. A disk 12 of insulating material, such as mica, is placed against said ribs. The disk has a central hole registering with the bore 11. A metal tube or sleeve 13 extends between the disks 12, abutting against them at its ends, preferably in line with the ribs 10. The disks extend considerably beyond said ribs, being supported thereby away from the heads, so that a long creepage surface is established between said head at the rib 10 and the end of the tube 13. In order to give stiffness to the structure, the tube is preferably made considerably larger than the bore 11, and is provided with a filling 14, preferably of some insulating material. The filling has a longitudinal hole 15 registering with the bore 11 in each head and serving to conduct water or steam from one pipe section to the other.

The heads 7, 8 extend beyond the edges of the mica disks 12 and are perforated to receive screw-threaded studs 16 and nuts 17 by means of which the heads are clamped tightly against the disks and tube. A long bushing 18 of insulating material surrounds each stud where it passes through a head. A washer 19 of insulating material is interposed between each nut and the head 8 adjacent thereto, preferably with a metallic washer 20 of smaller diameter on each side of it, to lift it away from the head and increase the creepage surface. The studs extend considerably beyond the head 7, so that a helical spring 21 can be placed around each one, between the nut and a washer 22 of insulating material. A smaller metallic washer 23 raises the washer 22 away from the head 8, and two coned washers 24 are fitted to the ends of the spring, against the washer 22 and the nut 17 respectively.

It will be noted that the two pipe sections are effectually insulated from each other and that ample creepage surfaces are provided to prevent leakage of current around the two mica disks or along the studs. Any expansion or contraction of the tube 13 is provided for by the springs, so that the joint is kept steam tight at all times.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. An insulating pipe-joint comprising two heads, an interposed tube, means for clamping said parts together, and means for insulating said tube from said heads.

2. An insulating pipe-joint comprising two heads, an interposed tube, means for clamping said parts together, and disks of insulating material between said tube and heads.

3. An insulating pipe-joint comprising two heads, an interposed tube, means for clamping said parts together, disks of insulating material between said tube and heads, and means for preventing the outer portions of said disks from touching said heads.

4. An insulating pipe-joint comprising two heads having screw-threaded nipples on one side and ribs on the other, disks of insulating material placed on said ribs, a tube interposed between said disks, and means for clamping said parts together.

5. An insulating pipe-joint comprising two heads, a tube interposed between them, insulating material between said tube and heads, studs passing through said heads and provided with nuts, and insulating material between said studs and nuts and said heads, all of said insulating material being arranged to give long creepage surfaces.

6. An insulating pipe-joint comprising two heads, a tube interposed between them, insulating material between said tube and heads, studs passing through said heads and provided with nuts, insulating material between said studs and nuts and said heads, all of said insulating material being arranged to give long creepage surfaces, and a spring on each stud between one of its nuts and the adjoining head.

In witness whereof, I have hereunto set my hand this 26th day of September, 1908.

ASA F. BATCHELDER.

Witnesses:
 BENJAMIN B. HULL,
 MARGARET E. WOOLLEY.